United States Patent [19]
Batson et al.

[11] Patent Number: 6,098,126
[45] Date of Patent: *Aug. 1, 2000

[54] METHOD AND APPARATUS FOR SYNCHRONIZATION OF DATA RETRIEVAL AND PRESENTATION

[75] Inventors: James D. Batson, Sunnyvale; J. Peter Hoddie, Mountain View, both of Calif.

[73] Assignee: Apple Computer, Inc., Cupertino, Calif.

[*] Notice: This patent is subject to a terminal disclaimer.

[21] Appl. No.: 09/181,074

[22] Filed: Oct. 27, 1998

Related U.S. Application Data

[63] Continuation of application No. 08/868,025, Jun. 3, 1997, Pat. No. 5,828,904, and a continuation of application No. 08/438,199, May 9, 1995, abandoned.

[51] Int. Cl.$^7$ ..................................................... G06F 13/00
[52] U.S. Cl. .......................... 710/58; 709/102; 709/103; 709/104; 710/29
[58] Field of Search ........................ 710/29, 58; 709/103, 709/104, 102

[56] References Cited

U.S. PATENT DOCUMENTS

| | | | |
|---|---|---|---|
| 4,305,131 | 12/1981 | Best | 345/327 |
| 4,497,023 | 1/1985 | Moorer | 712/22 |

(List continued on next page.)

OTHER PUBLICATIONS

Long, Darrell D.E., Scheduling Real–Time Disk Transfers for Continuous Media application, IEEE, pp. 227–232, 1993.

Tsai, Wen Jin, Storage Design and Retrieval of Continuous Multimedia Data Using Multi–Disks, IEEE, pp. 148–153.

Little, Thomas D.C., Multimedia Object Models for Synchronization and Database, IEEE, pp. 20–27.

Want, R.A., A multimedia File Structure for Continuous and Discrete Media, IEEE, pp. 644–647.

Little, Thomas D.C., "Synchronization and Storage Models for Multimedia Objects," *IEEE*, pp. 413–426 (1990).

Baruah, Sanjoy K., "Strong P–Fairness: A Scheduling Strategy for Real–Time Applications," *IEEE*, pp. 16–20 (1994).

Linington, P.F., "Co–Ordinating Stored Media," *IEEE*, pp. 8/1–8/3 (1994).

*Primary Examiner*—Thomas C. Lee
*Assistant Examiner*—Tammara Peyton
*Attorney, Agent, or Firm*—Blakely, Sokoloff, Taylor & Zafman

[57] ABSTRACT

An apparatus for synchronizing data retrieval is described. The apparatus comprises a storage media storing data, a storage control device coupled to the storage media for retrieving the data from the storage media, memory coupled to the storage control device for storing the data; and a scheduling unit coupled to the memory for scheduling retrieval of the data from the storage media before a specified time. A storage media for storing computer instructions is also described. The storage media comprises a first plurality of processor executable instructions for instructing a computer system to schedule retrieval of data from a storage device before a specified time, a second plurality of processor executable instructions for instructing the computer system to retrieve the data from the storage device before the specified time has elapsed, a third plurality of processor executable instructions for instructing the computer system to store the data from the storage device into memory, and a fourth plurality of processor executable instructions for instructing the computer system to process the data from the memory. A method for synchronizing data retrieval in a data processing system is also described. The method comprises determining a specified time for retrieving the data from a storage media, scheduling retrieval of the data from the storage media before the specified time, retrieving the data from the storage media before the specified time has elapsed, and processing the data from the storage media.

50 Claims, 11 Drawing Sheets

U.S. PATENT DOCUMENTS

| | | | |
|---|---|---|---|
| 4,989,133 | 1/1991 | May et al. | 709/102 |
| 5,202,977 | 4/1993 | Pasetes, Jr. et al. | 395/500 |
| 5,239,464 | 8/1993 | Blair et al. | 345/156 |
| 5,278,984 | 1/1994 | Batchelor | 709/300 |
| 5,287,466 | 2/1994 | Kodama | 712/206 |
| 5,367,641 | 11/1994 | Pressprich et al. | 710/129 |
| 5,404,505 | 4/1995 | Levinson | 707/10 |
| 5,420,801 | 5/1995 | Dockter et al. | 345/501 |
| 5,428,525 | 6/1995 | Cappelaere et al. | 364/148.84 |
| 5,428,547 | 6/1995 | Ikeda | 364/474.16 |
| 5,440,730 | 8/1995 | Elmasri et al. | 707/203 |
| 5,668,948 | 9/1997 | Belknap et al. | 709/231 |
| 5,703,996 | 12/1997 | Omura et al. | 386/68 |

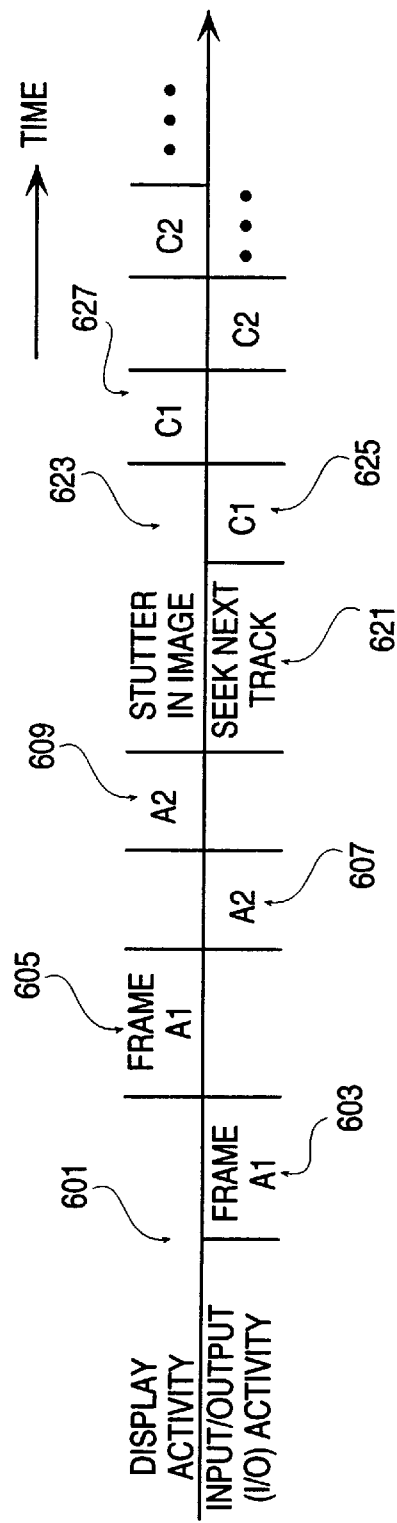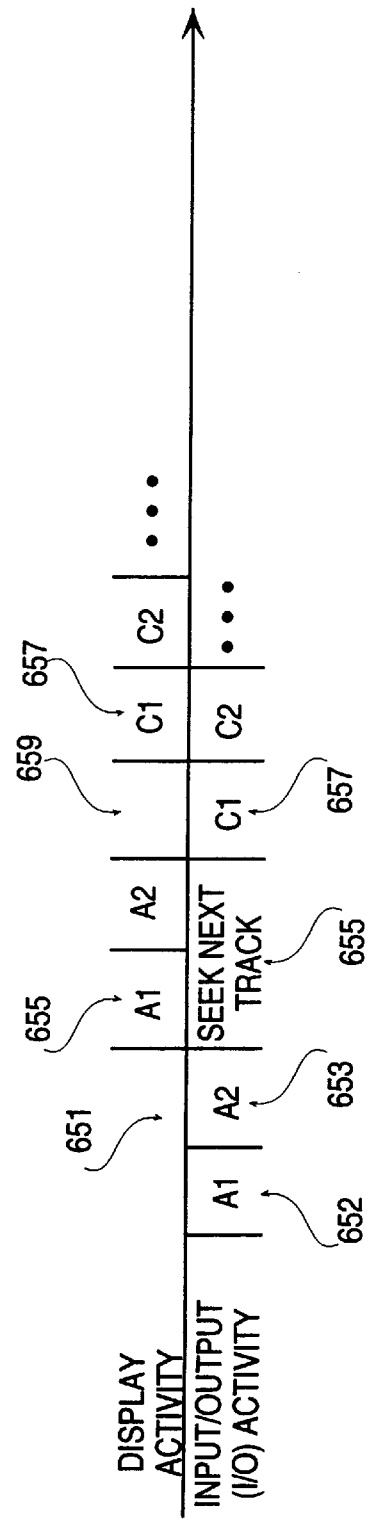
FIGURE 6A (Prior Art)
FIGURE 6B

METHOD AND APPARATUS FOR SYNCHRONIZATION OF DATA RETRIEVAL AND PRESENTATION

This application is a continuation of Ser. No. 08/868,025 filed Jun. 3, 1997 now U.S. Pat. No. 5,828,904, and continuation of Ser. No. 08/438,199 filed May 9, 1995, now abandoned.

FIELD OF THE INVENTION

The present invention relates to the field of information retrieval and processing in a data processing system. More particularly, the present invention relates to the synchronization of retrieval of time dependent data in a data processing system.

BACKGROUND OF THE INVENTION

Computer systems, and data processing systems generally that utilize time dependent data such as audio data or video data to produce a time dependent presentation require a synchronization mechanism to synchronize the retrieval of the time dependent data. Without synchronization, the time dependent data cannot be retrieved at the appropriate time and the data would not be available for use at the appropriate time. As a result, the time dependent presentation would have a discontinuity due to the unavailability of the data. In the case of video data, there is typically a sequence of images ("frames") which, when the images are displayed in rapid sequence (e.g. each frame being displayed for ⅓₀th of a second immediately after displaying a prior frame), will create the impression of a motion picture. The human eye is particularly sensitive to discontinuities in a motion picture. With video images, the discontinuity would manifest itself as a stutter in the video image or a freeze-up (e.g. a single frame being displayed considerably longer than ⅓₀th of a second) in the video image. With audio presentations, the discontinuity would manifest itself as a period of silence or a pause.

One prior technique synchronized the retrieval of time dependent data by utilizing an instruction or a set of instructions to retrieve the time dependent data just prior to the time dependent presentation by the computer system or data processing system. In retrieving the time dependent data, an instruction or a set of instructions is used to search for the data file in the root directory of the storage media containing the data. The storage media is typically a floppy disk, hard disk or CD-ROM disk or some other mass storage media. After the data file is located, the starting cluster number for the file is retrieved from the root directory and stored in memory of the computer system. The file allocation table of the storage media is then accessed and the starting cluster number is used to determine the second cluster number. The second cluster number is determined by retrieving the value stored in the location corresponding to the starting cluster number. The value is stored in memory as the second cluster number. If the value indicates the end of the data file, retrieval of cluster information ceases. However, if the value indicates a second cluster number, the second cluster number is used to determine the third cluster number by retrieving the value stored in the location corresponding to the second cluster number. The retrieval of cluster numbers continues until a value indicating the end of the data file is retrieved. After all the cluster numbers for the data file have been retrieved from the root directory and file allocation table, the data is retrieved from the storage media using the cluster numbers. The data located in the starting cluster is retrieved followed by the data from the second cluster and so forth until the data from the last cluster is retrieved. The data from the clusters is stored in memory and utilized by the computer system to produce a time dependent presentation.

However, because the cluster numbers for the time dependent data are retrieved just prior to the time dependent presentation by the computer system, any interruption of sufficient duration which interferes with the ability of the computer system to retrieve the cluster numbers affects the retrieval of time dependent data from the storage media. FIG. 1a shows a typical implementation in the prior art wherein the time dependent data is retrieved just prior to the time dependent presentation and wherein there is no scheduling of the retrieved process. An example of this prior art can be found in the software product known as QuickTime (version 1.0) from Apple Computer, Inc. of Cupertino, Calif. This prior art software is susceptible to the interruption noted above. The interruption can be caused by the servicing of a hardware interrupt or software interrupt. The delayed retrieval of presentation data caused by the interruption in turn affects the time dependent presentation causing image stutter, image freeze-ups, and/or periods of silence or pauses.

Thus, what is needed is a system that retrieves time dependent data in a more continuous manner.

SUMMARY OF THE INVENTION

The present invention includes a method and an apparatus for synchronization of data retrieval; this data may be video and audio data which includes a sequence of frames of video data and corresponding audio data for each frame. This synchronization method typically includes the steps of determining a specified time for retrieving data (e.g. a frame of video data and corresponding audio data) from a storage media and scheduling retrieval of the data from the storage media at or before the specified time. At or before the specified time (e.g. the specified time has elapsed), the data is retrieved from the storage media and typically stored into a memory (for example a general purpose RAM of a computer system or a dedicated frame buffer). The data is then typically processed in a conventional manner which may include reading the data out to a display device (e.g. CRT monitor) or (if the data is audio data) to a sound transducer (e.g. a speaker). In one embodiment of the invention, the task of scheduling the retrieval of the data is implemented by creating a retrieval request and sorting pending retrieval requests. The task of processing the data is implemented by determining a specified display time for displaying or otherwise presenting the data and scheduling a display (or presentation) interrupt to occur at the specified display time.

In one embodiment, the apparatus of the invention includes a storage media which stores the data (e.g. video frame data) and a storage control device which is coupled to the storage media to retrieve the data from the storage media. The apparatus further includes a memory coupled to the storage control device in order to store the retrieved data and a scheduling unit which is coupled to the memory. The scheduling unit may be, in one embodiment, a microprocessor programmed in a manner consistent with the present invention to schedule the retrieval of the data from the storage media at a specified time. In one embodiment, the storage media may be a conventional CD-ROM or a magnetic hard disk media, and the storage control device may respectively be a CD-ROM controller or a hard-disk controller. Alternatively, the storage media may be a remotely located storage device which is accessed through a network; this type of storage media may be referred to as a networked (or shared) storage media. The memory may comprise general purpose RAM (Random Access Memory).

According to another aspect of the present invention, a storage media for storing computer instructions is provided. This media includes a first plurality of processor executable instructions for instructing a computer system to schedule retrieval of data from a storage device (e.g. a CD-ROM) at or before a specified time. The media also includes a second plurality and third plurality of processor executable instructions. The second plurality is for instructing the computer system to retrieve the data from the storage device at or before the specified time (e.g. the specified time has elapsed). The third plurality is for instructing the computer system to store the data retrieved from the storage device into memory (e.g. RAM of the computer system).

BRIEF DESCRIPTION OF THE DRAWINGS

The present invention is illustrated by way of example, and not by way of limitation, in the figures of the accompanying drawings and in which like reference numerals refer to similar elements and in which:

FIGS. 6a and 6b show a comparison of two timing diagrams, one (FIG. 6b) which depicts the result of time dependent data retrieval and presentation according to the present invention and the other (FIG. 6a) depicting the result of time dependent data retrieval and presentation according to the prior art.

DETAILED DESCRIPTION

A novel method and apparatus for synchronization of time dependent data is described. In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
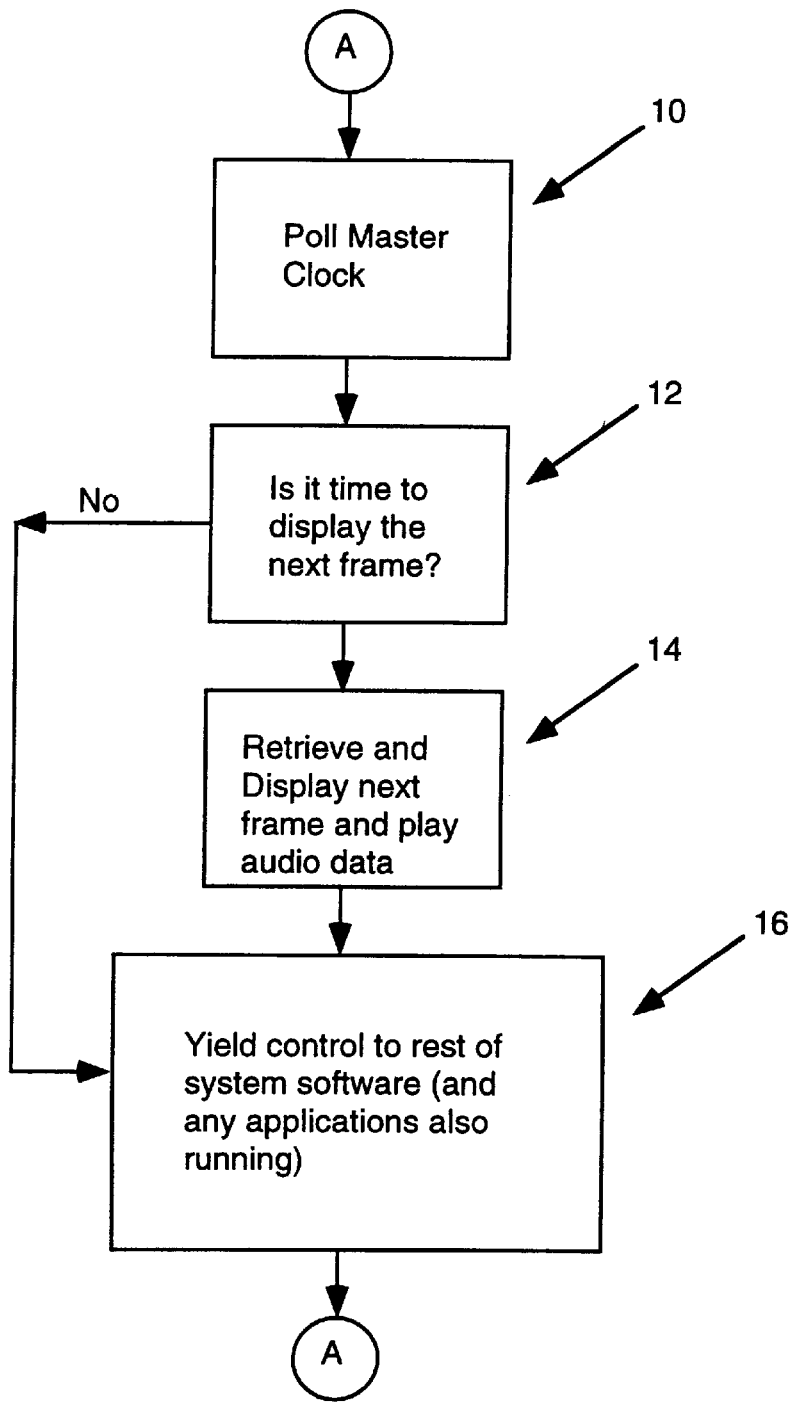
FIG. 1a shows, in flowchart form, a process according to the prior art for retrieving time dependent data from a storage device.
Figure 1B:
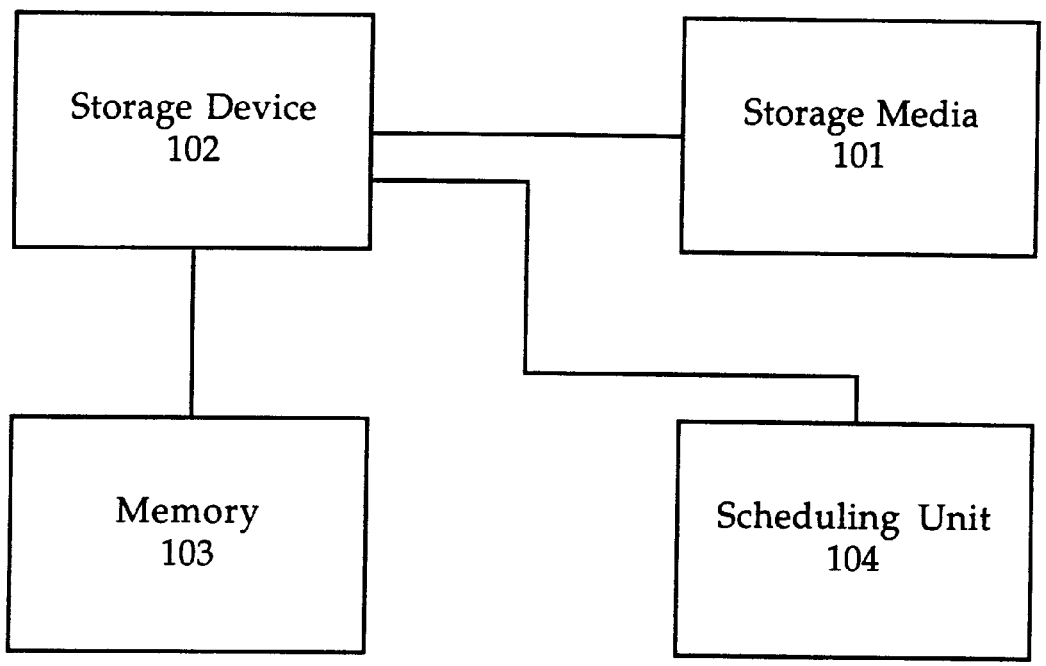
FIG. 1b shows, in block diagram form, and embodiment of the apparatus of the present invention.

FIG. 1b illustrates in block diagram form an apparatus for synchronizing data retrieval of one embodiment of the present invention. Apparatus 100 comprises storage media 101, storage device 102, memory 103 and scheduling unit 104. Storage media 101 is coupled to storage device 102, and storage control device 102 is coupled to memory 103. Storage control device 102 is also coupled to scheduling unit 104. Storage media 101 can comprise a floppy disk, a hard disk, a compact disk or other storage media. Storage media 101 stores data. The data can be video data, audio data or other forms of data. Storage control device 102 can comprise a floppy disk drive controller, hard disk drive controller, CD-ROM drive controller or other input/output controllers for storage devices. Storage control device 102 retrieves data from storage media 101. The data retrieved by storage control device 102 can be transferred to memory 103. Memory 103 can comprise a static random access memory (SRAM), dynamic random access memory (DRAM), cache memory or other memory device. Memory 103 stores the data transferred from storage device 102. This data may be stored in a frame buffer, which may be part of memory 103. Scheduling unit 104 can comprise an Application Specific Integrated Circuit (ASIC) component, logic circuitry, or a general purpose microprocessor and operating under control of software instructions. Scheduling unit 104 schedules retrieval of the data from storage media 101 at or before a specified time.

Figure 2:
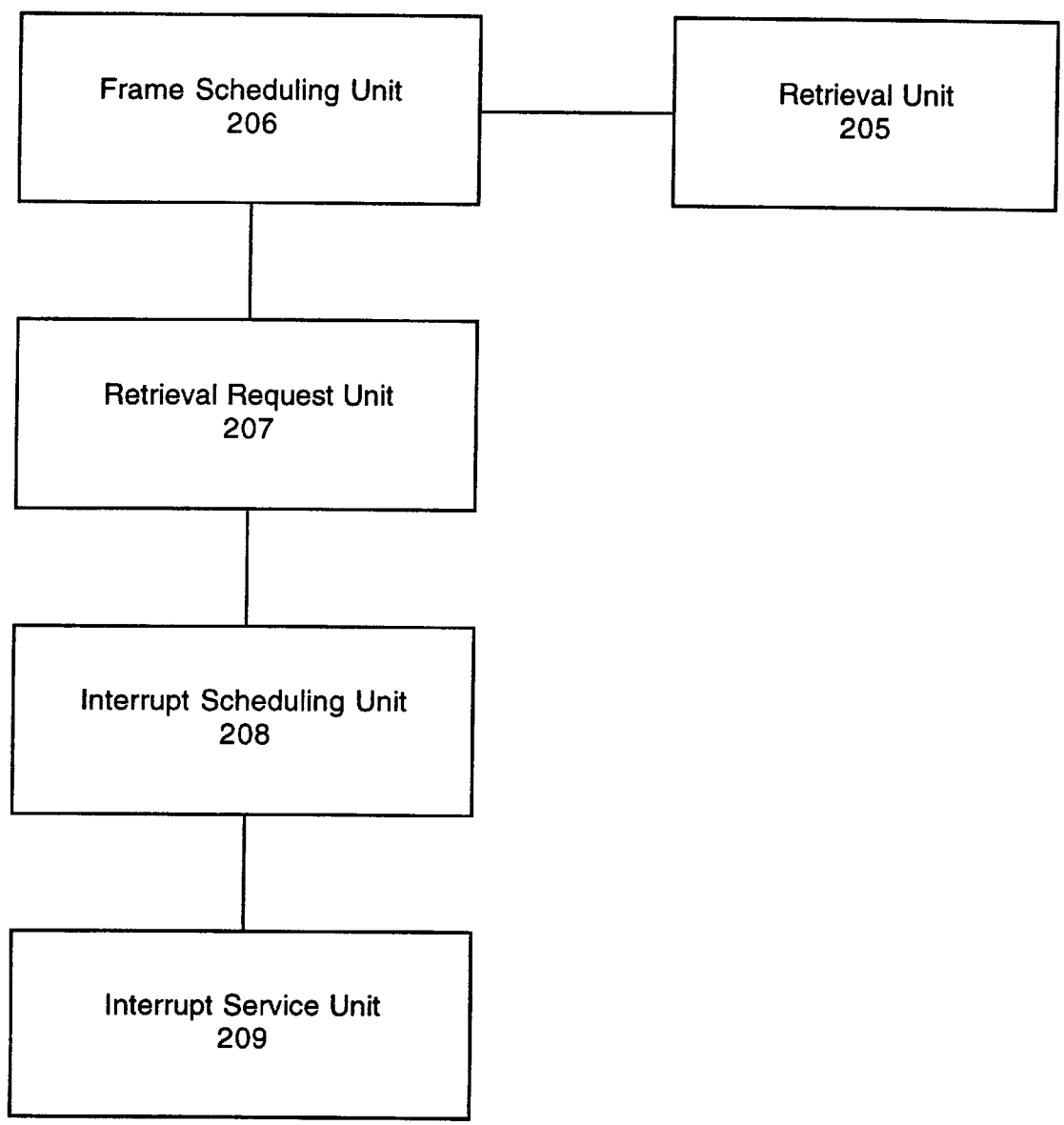
FIG. 2 shows, in block diagram form, a scheduling unit of an embodiment of the apparatus of the invention.

FIG. 2 illustrates in block diagram form a scheduling unit of a second embodiment of the present invention. Scheduling unit 204 can be an implementation of the scheduling unit of FIG. 1. Scheduling unit 204 comprises retrieval unit 205, frame scheduling unit 206, retrieval request unit 207 and interrupt scheduling unit 208. Retrieval unit 205 is coupled to frame scheduling unit 206 and frame scheduling unit 206 is coupled to retrieval request unit 207. Retrieval request unit 207 is coupled to interrupt scheduling unit 208. Retrieval unit 205, frame scheduling unit 206, retrieval request unit 207, interrupt scheduling unit 208 and interrupt service unit 209 can comprise circuitry, or a general purpose microprocessor and memory with software instructions and circuitry, or a general purpose microprocessor and memory with software instructions. Frame scheduling unit 206 schedules retrieval of data from storage media 101 at a specified time by creating a retrieval request for retrieving the data from storage media 101 at or before the specified time. Retrieval unit 205 then retrieves information for locating the data in storage media 101 from storage media 101 and stores the information in memory 103. The information for locating the data in storage media 101 includes the starting cluster number and all subsequent cluster numbers for the data file containing the data. Retrieval request unit 207 sorts the pending retrieval requests in accordance with a predetermined ordering scheme and processes the retrieval requests in the sorted order. In processing a retrieval request, retrieval request unit 207 reads the data associated with the retrieval request. After the data is retrieved by retrieval request unit 207, interrupt scheduling unit 208 schedules a display interrupt for presenting (e.g. displaying) the data at a specified display time. When the specified display time has elapsed, the display interrupt scheduled by interrupt scheduling unit 208 occurs. Interrupt service unit 209 receives the display interrupt and services the interrupt thereby causing the presentation of the time dependent data (e.g. display of a video frame).

Figure 3:
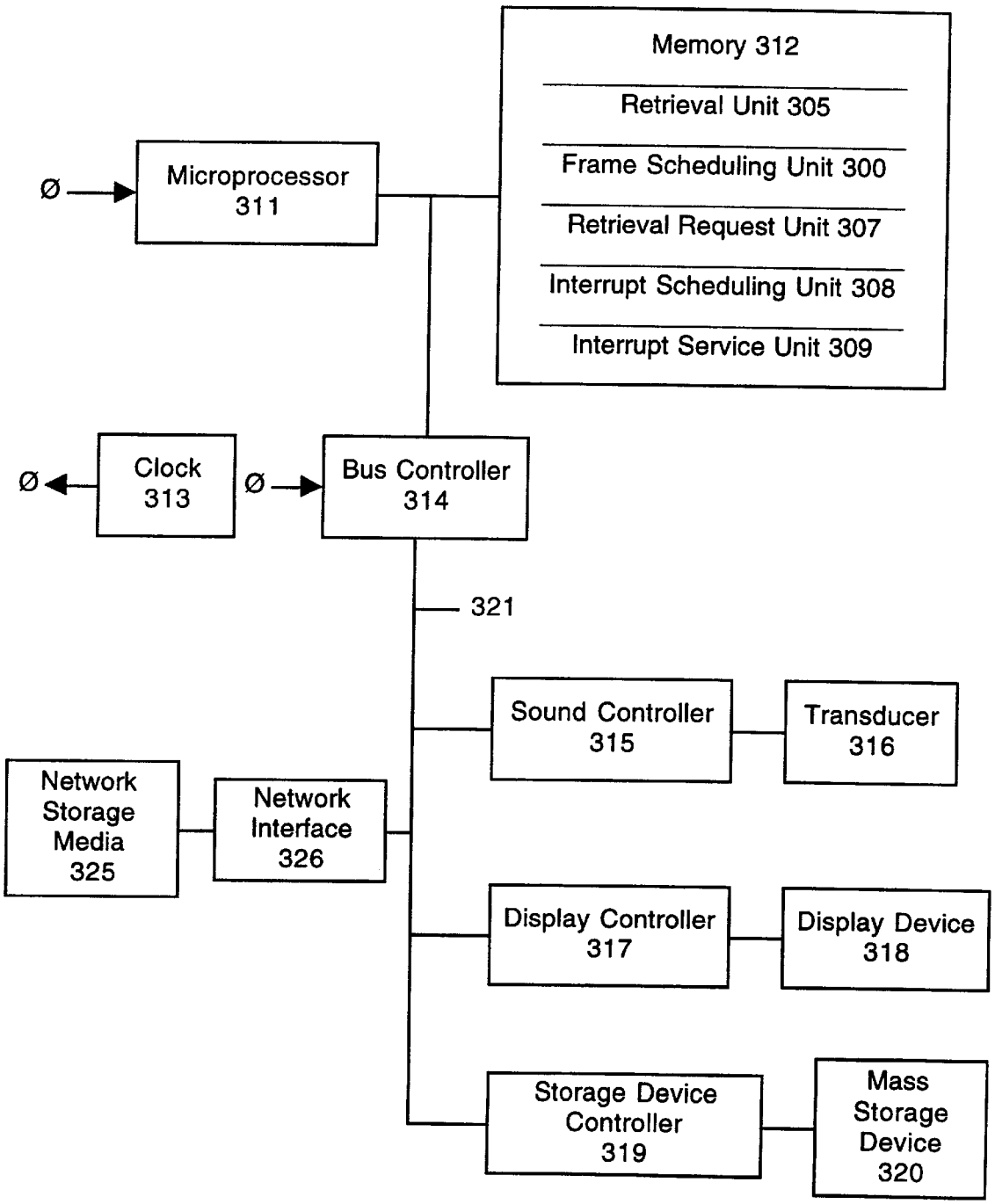
FIG. 3 is a block diagram illustrating a typical computer system which may implement the present invention.

FIG. 3 illustrates in block diagram form a typical computer system of a third embodiment of the present invention. Computer system 310 comprises microprocessor 311, memory 312, clock generator 313, bus controller 314, sound controller 315, sound transducer 316, display controller 317, display device 318, storage device controller 319, mass storage device 320 and bus 321. Microprocessor 311 is coupled to clock generator 313. Microprocessor 311 is also coupled to memory 312 and bus controller 314 by bus 321. Memory 312 is coupled to bus controller 314 by bus 321. Bus controller 314 is coupled to clock generator 313 to receive the clock signal "Ø". Bus controller 314 is also coupled to sound controller 315, display controller 317 and storage device controller 319 by bus 321. Sound controller 315 is coupled to sound transducer 316 which may, for example, be a conventional speaker. Display controller 317 is coupled to display device 318. Storage device controller 319 is coupled to mass storage device 320.

Processor 311 can be a complex instruction set computing (CISC) microprocessor, reduced instruction set computing (RISC) microprocessor, very long instruction word (VLIW) or other processor device. Processor 311 executes instructions or code stored in memory 312 and performs operations on audio data, video data or other data stored in memory 312 or, after retrieval, data from storage device 320.

Memory 312 can be a dynamic random access memory (DRAM), static random access memory (SRAM), cache memory or other memory device. Memory 312 can store instructions or code that are part of application programs, operating system programs or other computer programs. Memory 312 can also store audio data, video data or other forms of data. Memory 312 can transfer instructions or code that make up application programs, operating system programs or other computer programs to processor 311. Memory 312 can also transfer audio data, video data or other forms of data to processor 311. Memory 312 stores a first plurality of processor executable instructions, a second plurality of processor executable instructions, a third plurality of processor executable instructions, a fourth plurality of processor executable instructions and a fifth plurality of processor executable instructions. Retrieval unit 305 includes the first plurality of processor executable instructions which is executed by processor 311 in the manner shown in FIG. 5a. Frame scheduling unit 306 comprises the second plurality of processor executable instructions which is executed by processor 311 in the manner shown in FIG. 5a. Retrieval request unit 307 comprises the third plurality of processor executable instructions which is executed by processor 311 in the manner shown in FIG. 5b. Interrupt scheduling unit 308 comprises the fourth plurality of processor executable instructions stored in memory 312 which is executed by processor 311 in the manner shown in FIG. 5c. Interrupt service unit 309 comprises the fifth plurality of processor executable instructions stored in memory 312 which is executed by processor 311 in the manner shown in FIG. 5d.

Clock generator 313 can comprise a 25 megahertz oscillator, 33 megahertz oscillator, 50 megahertz oscillator, 66 megahertz oscillator, 75 megahertz oscillator, 90 megahertz oscillator, 100 megahertz oscillator or other oscillator device. Clock generator 313 provides a clock signal "Ø" to processor 311 and bus controller 314. Bus controller 314 can be a conventional, commercially available parallel bus controller. Bus controller 314 controls transmissions on bus 321. Sound controller 315 can be a conventional sound controller and acts as an interface between sound transducer 316 and processor 311. Transducer 316 can be a speaker or other sound producing device. Transducer 316 transforms electrical signals from sound controller 315 into sound. Display controller 317 can be a conventional display adapter or other display controllers. Display controller 317 acts as an interface between display device 318 and processor 311. In this embodiment, frame scheduling unit 306 determines a specified time for retrieving data from mass storage device 320. Frame scheduling unit 306 also schedules retrieval of the data from mass storage device 320 at the specified time. Processor 311 retrieves the data from mass storage device 320 (which typically includes a storage media such as a magnetic hard disk or an optical CD-ROM or other optical CD) when the specified time has elapsed. Processor 311 stores the retrieved data from mass storage device 320 into memory 312. Processor 311 then processes the data from memory 312. This processing typically includes reading the data out to display device 318. In this manner, data retrieval in computer system 310 is synchronized.

Figure 4:
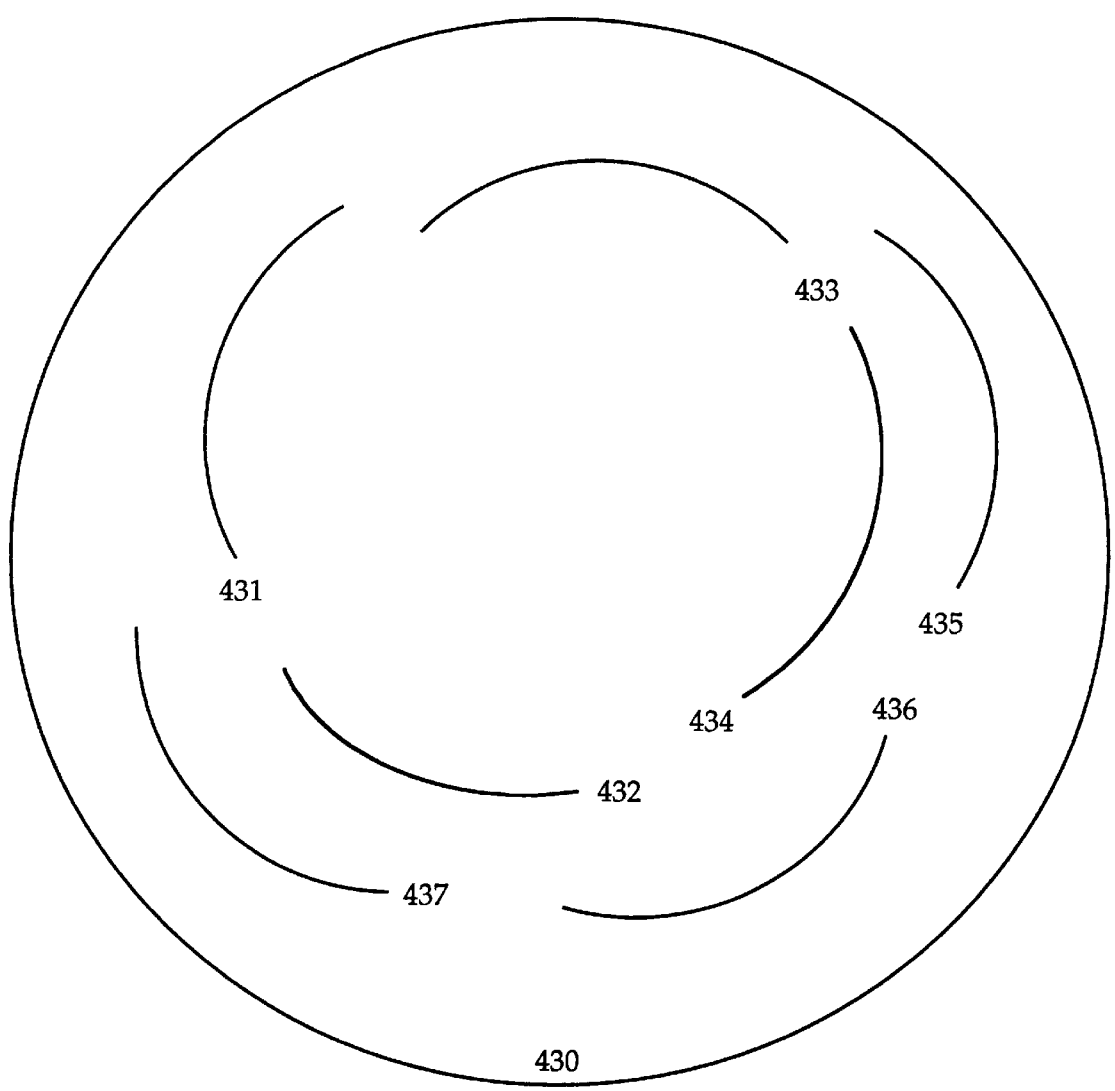
FIG. 4 illustrates a storage media storing computer instructions for implementing the invention on a typical computer system.

FIG. 4 illustrates in diagram form a storage media of a fourth embodiment of the present invention. Storage media 430 can be a floppy disk, hard disk, a compact disk (e.g. optical CD) or other storage media such as a storage media 325 accessed through a computer network and a network interface 326 (e.g. a local area network or wide-area network). Storage media 430 comprises instructions 431, instructions 432, instructions 433 and instructions 434. Storage media 430 can also comprise instructions 435, instructions 436 or instructions 437. The arrangement of instructions in FIG. 4 are for illustration purposes only. It will be appreciated that the instructions can be arranged in any order and in any location on storage media 430. Instructions 431 is a plurality of processor executable instruction for instructing a computer system to schedule retrieval of data from storage media 430 at a specified time. Instructions 432 is a plurality of processor executable instructions for instructing the computer system to retrieve the data from storage media 430 when at or before the specified time has elapsed. Instructions 433 is a plurality of processor executable instruction for instructing the computer system to store the data from storage media 430 into memory. Instructions 434 is a plurality of processor executable instructions for instructing the computer system to process the data from the memory. Instructions 435 is a plurality of processor executable instructions for instructing the computer system to retrieve information for locating the data in storage media 430 and to store the information in memory. The information for locating the data in storage media 430 includes the starting cluster number and all subsequent cluster numbers for the data file containing the data. Instructions 436 is a plurality of processor executable instructions for instructing the computer system to create a retrieval request for retrieving the data from storage media 430 before the specified time and to sort the pending retrieval requests. Instructions 437 is a plurality of processor executable instructions for instructing the computer system to determine a specified display (or presentation) time for displaying (or otherwise presenting) the data and scheduling a display interrupt to occur at the specified display time.

FIGS. 5a, 5b, 5c and 5d illustrate in flow chart diagram form the operation of the computer system of an embodiment of the present invention. The computer system retrieves time-dependent data typically in the form of or representing separate frames of video data and corresponding audio data. Typically, the data is retrieved so that 30 frames of video are displayed each second such that an animation is displayed; this animation results from the typical circumstance where the frames show a series of related images. The data being retrieved may be other types of streams of time based information, such as text for closed caption television, note based sound (e.g. MIDI based sound), sprite based animation or SIMPTE time code; the invention processes the retrieval of this data in the same manner as video data, and the presentation of such data follows the conventional procedures for the particular type of data.

Figure 5A:
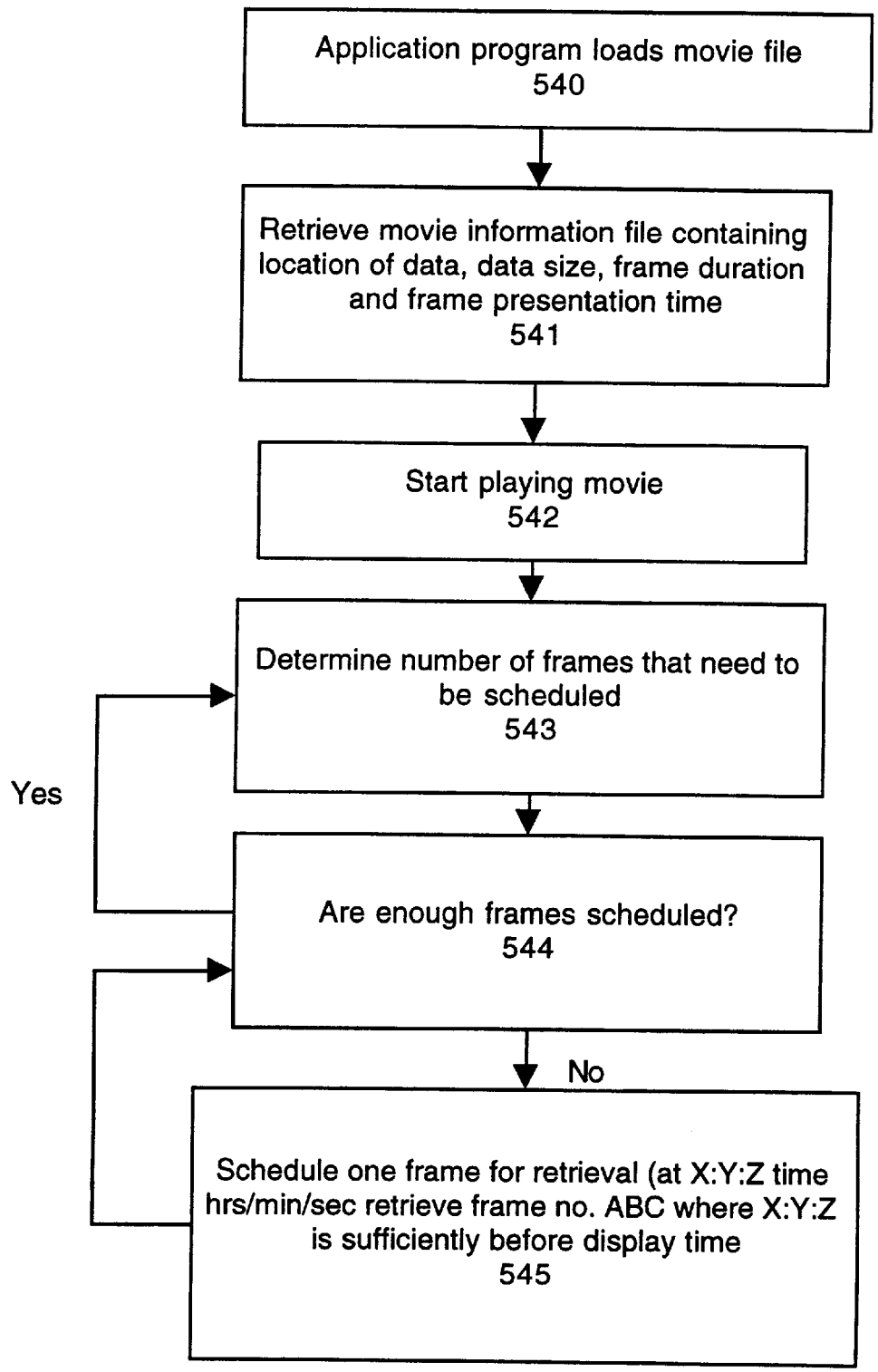
FIGS. 5a, 5b, 5c and 5d are flow charts showing an embodiment of a method according to the present invention.

The operation of retrieval scheduling is initiated when the application program loads an audio-visual file for instance, a movie file as shown in block 540 of FIG. 5a. The computer system then retrieves the movie information file which is a part of the movie file as shown in block 541. The movie information file contains the location of data, data size, frame duration and frame presentation time of all frames in the movie. The data for the first frames are retrieved and the movie is played as shown in block 542. The computer system then determines the number of frames that need to be scheduled for retrieval as shown in block 543. In determining the number of frames to be scheduled for retrieval, the computer system takes into account the latency and performance of the data source in addition to the frame duration or frame rate. As an example, a relatively high performance device source such as a local CD-ROM device would require the scheduling for retrieval of only one second of frames whereas a relatively low performance source such as a network storage device would require scheduling for retrieval of two to three seconds of frames. The actual number of seconds is predetermined for a particular data source and is set at a value which provides for an uninterrupted presentation given the expected delay of the particular source. The actual number of frames corresponding to the predetermined number of seconds is in turn, determined by the frame durations of the individual frames. In the example above, one second of frames at a frame rate of 30 frames per second would be 30 frames whereas a frame rate of 45 frames per second would require 45 frames. Likewise, two to three seconds of frames at a frame rate of 30 frames would require 60 to 90 frames whereas a frame rate of 45 frames per second would require 90 to 135 frames.

After determining the number of frames that need to be scheduled for retrieval, the computer system determines the number of frames that are currently scheduled and compares that number to the number that need to be scheduled for retrieval as shown in block 544. If the number of frames currently scheduled equals or exceeds the number of frames that need to be scheduled for retrieval, the computer system returns to block 543 and makes a new determination of the frames that need to be scheduled for retrieval based on a new frame rate. On the other hand, if the number of frames currently scheduled for retrieval is less than the number of frames that need to be scheduled for retrieval, the computer system schedules one additional frame for retrieval as shown in block 545. In scheduling a frame for retrieval, the computer system generates a retrieval request to retrieve the additional frame at or before a specified time (X:Y:Z). The specified time is set to a time which allows sufficient time for retrieval and display of the data. In addition, a retrieval request can correspond to one frame or a plurality of frames. After the additional frame is scheduled for retrieval, the computer system returns to block 543. If the additional frame is the last frame, the computer system ends the retrieval scheduling loop.

When the presentation of the movie involves multiple video tracks, multiple audio tracks, or multiple tracks of other time based data or multiple tracks of different forms of time-based data, the computer system performs the scheduling loop, blocks 543, 544 and 545, for each track. Thus, in the situation of multiple tracks, multiple groups of frames will be scheduled concurrently. When multiple streams of time based information are used with the invention (e.g. multiple streams of MIDI based sound or Sprite based animation or SIMPTE time code or a combination of such streams), these streams are scheduled for retrieval and presentation individually according to the present invention. It is noted that when more streams are being processed concurrently, the queue of scheduled "frames" should be extended in order to avoid latency due to processing of a large number of streams.

Figure 5B:
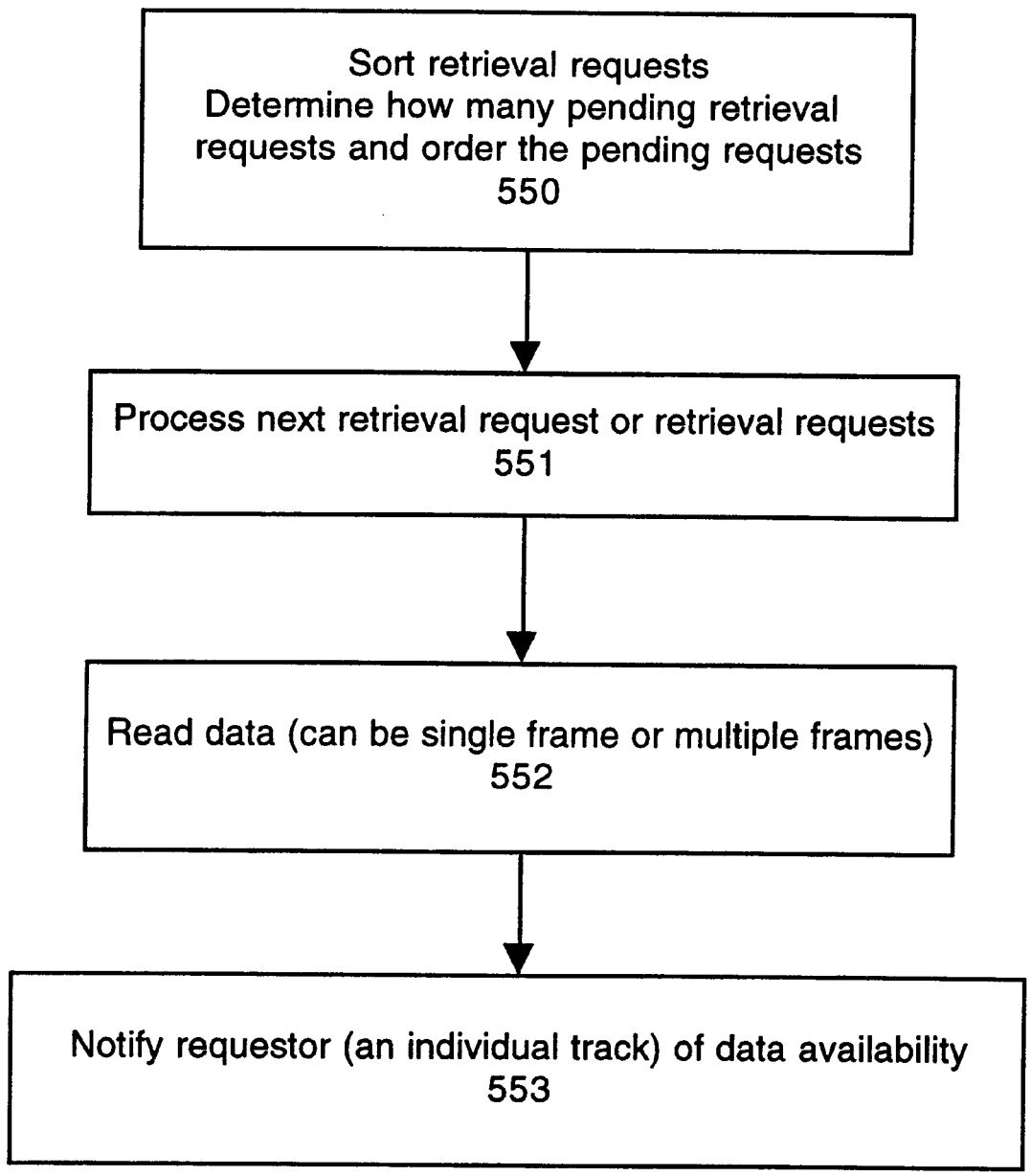

In addition to the scheduling loop, the computer system also performs the retrieval loop as illustrated in FIG. 5b. The computer system sorts the pending retrieval requests by determining the number of pending retrieval requests and ordering the pending retrieval requests as shown in block 550. In ordering the retrieval requests, the computer system takes into account the specified time associated with each retrieval request. The retrieval requests can be ordered by the specified times or by specified times and priority or by other protocols. In addition, the retrieval requests can be ordered one after another or can be ordered with multiple retrieval requests together in a single rank. Moreover, for multiple tracks, retrieval requests from each track are combined and sorted into a single list.

The computer system then processes the next retrieval request or requests from the list as shown in block 551. The computer system reads the data for the retrieval request or requests from the storage media as shown in block 552. The data can correspond to a single frame or multiple frames. After reading the data, the computer system notifies the requestor or requestors of data availability as shown in block 553. The requestors will generally be an individual track of the movie file. After notification, the computer system returns to block 550 to resort the pending retrieval requests. This allows later retrieval requests to be properly sorted in accordance with specified times or specified times and priority.

Figure 5C:
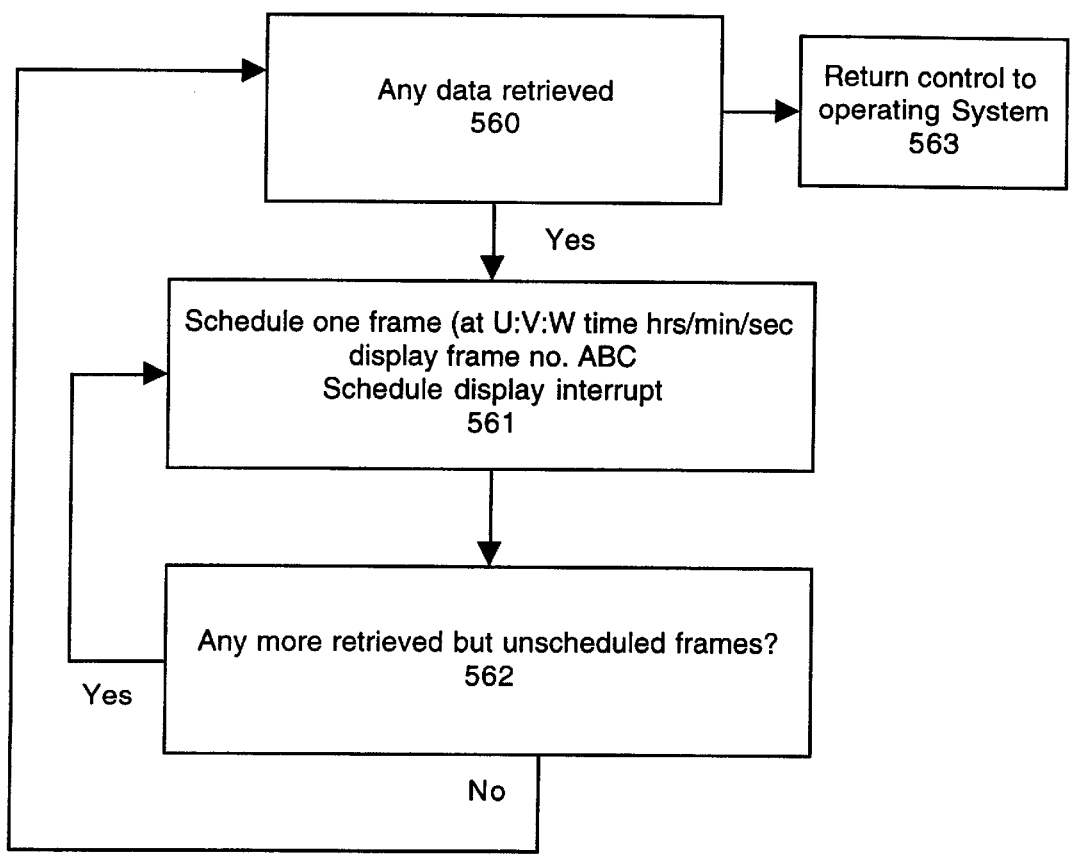

The computer system also performs the interrupt scheduling loop as illustrated in FIG. 5c. The computer system determines if data has been retrieved as shown in block 560. If no data has been retrieved, control is returned, in step 563, to the computer's operating system wherein the operating system performs conventional operating system tasks and periodically returns control to step 560 to determine again if any data is retrieved. If data has been retrieved, the computer system schedules a frame for display (or data for presentation) at time U:V:W by scheduling a display interrupt (or data presentation interrupt) for time U:V:W as shown in block 561. The computer system then determines if there are more retrieved frames without scheduled display interrupts as shown in block 562. If there are, the computer system returns to block 561 and schedules additional display interrupts for additional frames. If not, the computer system returns to block 560 and waits for additional data to be retrieved.

Figure 5D:
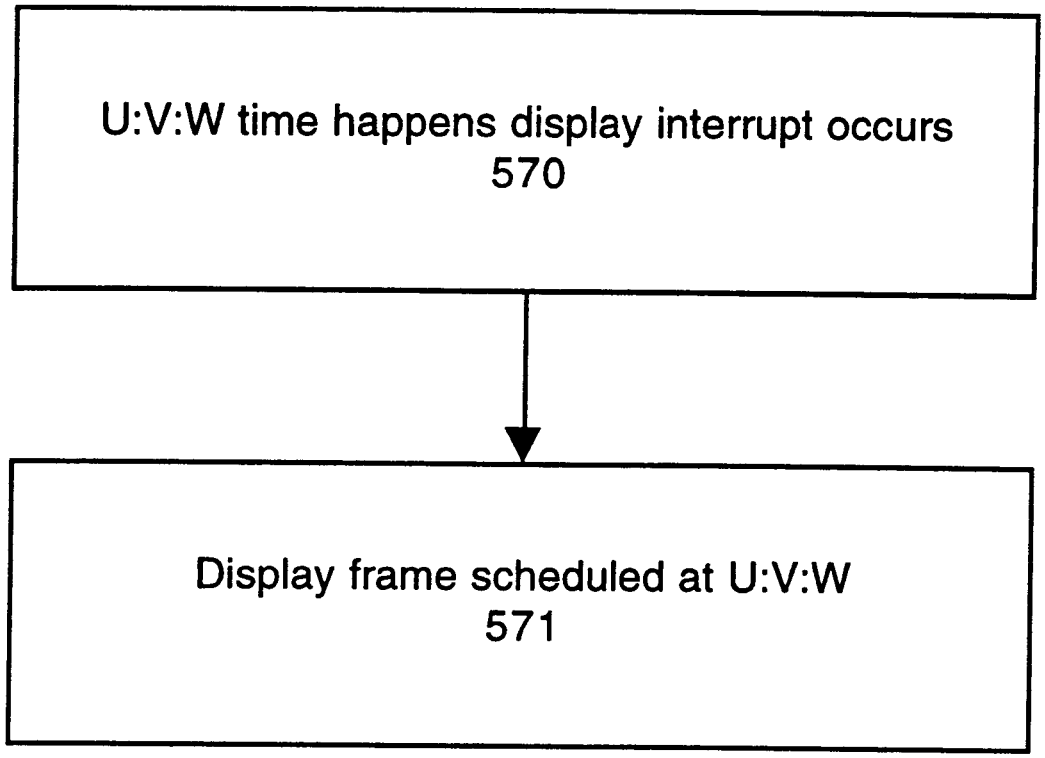

The computer system also performs the interrupt servicing loop as illustrated in FIG. 5*d*. The computer system waits for a display interrupt as shown in block 570. When a display interrupt occurs, the computer system displays the frame scheduled at time U:V:W as shown in block 571.

It will be appreciated that in a multi-tasking environment, the computer system can perform the scheduling loop, retrieval loop, interrupt scheduling loop and interrupt servicing loop simultaneously. Alternatively, in a time-splitting environment, the computer system can switch between loops performing only one at any given instance of time but performing all four simultaneously over a given period of time.

An example of the invention, shown in FIG. 6*b*, will now be compared to an example of the prior art shown in FIG. 6*a*. Both FIGS. 6*a* and 6*b* represent time diagrams 601 and 651 where the progression of time is shown along the horizontal axis and display an input/output (I/O) activity events which occur during intervals of time are shown along this axis. Display events (e.g. showing the frames on a display device) are shown above the horizontal axis and input/output events (e.g. retrieving frames from a storage media) are shown below the horizontal axis. Thus, the duration of the retrieval of frame A1 from the storage media in the prior art is represented by interval 603 in FIG. 6*a*, and the duration of the display (on the display device) of frame A1 in the prior art is represented by interval 605. It will be appreciated that, in these FIGS., the relative size of the events (e.g. I/O activity 603 for frame A1 in FIG. 6*a* versus display activity 605 for the same frame in FIG. 6*a*) is not intended to be accurate. For example, the duration of the I/O activity for a particular frame may be shorter than the duration for the display activity. Also, it will be appreciated that the number of frames has been greatly reduced from a typical sequence of frames which is displayed.

As shown in FIG. 6*a*, data for frame A1 is retrieved from the storage media/device during interval 603 just prior to the display of frame A1 during interval 605. This results from the use, in the prior art, of the method shown in FIG. 1*a* where there is no scheduling of the retrieval of subsequent frames. Thus, the retrieval process for a frame is triggered by a clock which indicates that it is time to display the frame and then the frame is immediately displayed. With a high speed processor and no other interruptions (such as the user of the computer system requesting the computer to perform some operation other than display a "movie") the playback of an unedited sequence of frames (which are not stored in a fragmented manner) will resemble a motion picture or movie, even in the prior art.

However, digital movies on a computer system are often edited by cutting and splicing together different sequences of frames; for example, the original digital movie had a sequence of frames A1-to-An then B1-to-Bn and then C1 to Cn such that playback of this original sequence began with frame A1 and ended with frame Cn, and this original digital movie was edited such that the B1 to Bn sequence was removed (cut out) and the A1 to An sequence was spliced to the C1 to Cn sequence. The resulting edited movie begins with frame A1 and ends with Cn but no frames from the B1 to Bn sequence are shown in this edited digital movie.

Figure 6C:
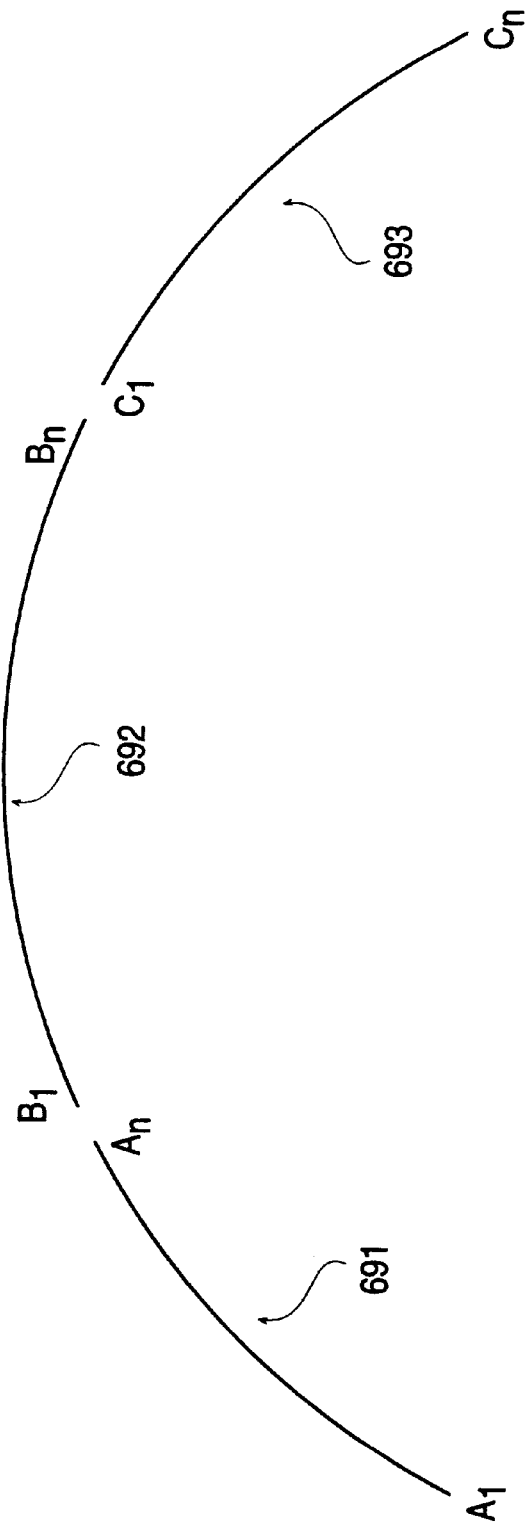
FIG. 6c shows data for frames stored on a storage media.

Due to the conventional way the tracks of data for the frames are stored on storage media (e.g. a hard disk or CD-ROM), the edited digital movie will typically playback with an interruption which appears as a stutter 623 in the movie. An example of this storage of tracks is shown in FIG. 6*c* where track 691 stores frames A1-to-An and track 692 stores frames B1 to Bn and track 693 stores frames C1 to Cn. Normally, the movement of the reading head from track 691 to track 692 (or frame track 692 to track 693) is relatively quick and thus there is little interruption (if any) on playback of the unedited digital movie. However, when the movie is edited, the reading head (which reads the storage media to retrieve the data for the frames) must now seek the next track (e.g. track 693) before beginning to retrieve it. This seek time (e.g. interval 621 in FIG. 6*a*) can be long enough that the smooth playback of frames is interrupted resulting in inconsistent, stutter-like playback of the digital movie, shown as interval 623 in FIG. 6*a*. It will be appreciated that this interruption can occur even in an unedited digital movie when the tracks are stored in a fragmented manner on a hard disk. As is well known, this fragmentation often happens when a well used hard disk has had many files added and deleted over time such that the tracks for a digital movie are stored in a scattered, fragmented manner across the hard disk's magnetic platter.

By use of the present invention, the stutter in playback caused by, for example, interruptions or fragmented storage of movie tracks can be minimized or eliminated. An example of this is shown in FIG. 6*b*. According to the invention the retrieval of the time dependent audiovisual data for the frames is scheduled before the frame is actually needed to be displayed. In one embodiment, up to 30 frames are scheduled for retrieval before being needed for display. This provides a queue of scheduled frames which will keep the display activity relatively uninterrupted even if there is seek time (e.g. interval 655) required for the data retrieval process. In an embodiment according to the invention, a limited number of the next frames may be actually retrieved and stored in memory such that these next frames are buffered in memory and are ready for display. As shown in FIG. 6*b*, the retrieval of frames A1 and A2 is scheduled before those frames are displayed and C1 is also scheduled causing the seek time 655 to occur during the display of frames A1 and A2 and this allows frame C1 to closely follow frame A2 resulting in little or no stutter 659 in the playback of the digital movie. Thus, the method and apparatus of the invention provide more realistic playback of digital movies from retrieval of time dependent audiovisual data stored on storage media even if the movie has been edited or is stored in a fragmented manner or there are system or user interruptions which cause the computer system to temporarily stop processing the playback of the digital movie.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for synchronization of data retrieval has been described.

What is claimed is:

1. A method for synchronizing data retrieval in a data processing system comprising:

determining only one specified time for retrieving data from a storage media;

scheduling retrieval of said data from said storage media at or before said specified time;

retrieving said data from said storage media at or before said specified time has elapsed; and processing said data from said storage media.

2. The method of claim 1 wherein said data comprises video data and wherein said processing comprises providing at least a portion of said data to a display device.

3. The method of claim 1 wherein said data comprises audio data and wherein said processing comprises providing at least a portion of said data to a sound transducer.

4. The method of claim 1 wherein scheduling retrieval of said data from said storage media at or before said specified time comprises:

retrieving information for locating said data in said storage media; and storing said information in a memory.

5. The method of claim 1 wherein scheduling retrieval of said data from said storage media at or before said specified time comprises:

creating a retrieval request for retrieving said data from said storage media before said specified time.

6. The method of claim 5 wherein scheduling retrieval of said data from said storage media at or before said specified time further comprises:

sorting pending retrieval requests.

7. The method of claim 5 wherein scheduling retrieval of said data from said storage media at or before said specified time further comprises:

reading said data from said storage media; and notifying a requestor of data availability.

8. The method of claim 7 wherein reading said data from said storage media comprises reading said data through a computer network.

9. The method of claim 1 wherein processing said data from said storage media comprises:

determining a specified display time for displaying said data; and scheduling a display interrupt to occur at said specified display time for displaying said data.

10. The method of claim 9 wherein processing said data from said storage media further comprises:

displaying said data when said display interrupt occurs.

11. The method of claim 1 wherein said data represents musical notes and said processing step comprises providing at least a portion of said data to a sound transducer to produce sound.

12. The method of claim 11 wherein said data comprises MIDI formatted information.

13. The method of claim 1 wherein said data comprises text and wherein said processing step comprises providing at least a portion of said data to a display device.

14. The method of claim 1 wherein said storage media is an optical disk.

15. The method of claim 14 wherein said optical disk is a CD-ROM.

16. The method of claim 1 further comprising:

determining a second specified time for retrieving a second set of data from said storage media;

scheduling retrieval of said second set of data from said storage media at or before said second specified time;

retrieving said second set of data from said storage media at or before said second specified time has elapsed;

processing said second set of data from said storage media.

17. The method of claim 16 wherein said data is located in a first track of a first file and said second set of data is located in a second track of said first file.

18. The method of claim 16 wherein said data is located in a first track of a first file and said second set of data is located in a second track of a second file.

19. The method of claim 1 wherein said data comprises SMPTE time codes.

20. The method of claim 1 wherein said data comprises Sprite based animation information.

21. A readable storage media for storing executable computer instructions which, when executed on a digital processing system cause said system to perform a method comprising:

determining only one specified time for retrieving data from a storage media;

scheduling retrieval of said data from said storage media at or before said specified time;

retrieving said data from said storage media at or before said specified time has elapsed; and processing said data from said storage media.

22. The readable storage media of claim 21 wherein said data comprises video data and wherein said processing comprises providing at least a portion of said data to a display device.

23. The readable storage media of claim 21 wherein said data comprises audio data and wherein said processing comprises providing at least a portion of said data to a sound transducer.

24. The readable storage media of claim 21 wherein scheduling retrieval of said data from said storage media at or before said specified time comprises:

retrieving information for locating said data in said storage media; and storing said information in a memory.

25. The readable storage media of claim 21 wherein scheduling retrieval of said data from said storage media at or before said specified time comprises:

creating a retrieval request for retrieving said data from said storage media before said specified time.

26. The readable storage media of claim 25 wherein scheduling retrieval of said data from said storage media at or before said specified time further comprises:

sorting pending retrieval requests.

27. The readable storage media of claim 25 wherein scheduling retrieval of said data from said storage media at or before said specified time further comprises:

reading said data from said storage media; and notifying a requestor of data availability.

28. The readable storage media of claim 27 wherein reading said data from said storage media comprises reading said data through a computer network.

29. The readable storage media of claim 21 wherein processing said data from said storage media comprises:

determining a specified display time for displaying said data; and scheduling a display interrupt to occur at said specified display time for displaying said data.

30. The readable storage media of claim 29 wherein processing said data from said storage media further comprises:

displaying said data when said display interrupt occurs.

31. The readable storage media of claim 21 wherein said data represents musical notes and said processing step comprises providing at least a portion of said data to a sound transducer to produce sound.

32. The readable storage media of claim 31 wherein said data comprises MIDI formatted information.

33. The readable storage media of claim 21 wherein said data comprises text and wherein said processing step comprises providing at least a portion of said data to a display device.

34. The readable storage media of claim 21 wherein said storage media is an optical disk.

35. The readable storage media of claim 34 wherein said optical disk is a CD-ROM.

36. The readable storage media of claim 21 wherein said method further comprises:

determining a second specified time for retrieving a second set of data from said storage media;

scheduling retrieval of said second set of data from said storage media at or before said second specified time;

retrieving said second set of data from said storage media at or before said second specified time has elapsed;

processing said second set of data from said storage media.

37. The readable storage media of claim 36 wherein said data is located in a first track of a first file and said second set of data is located in a second track of said first file.

38. The readable storage media of claim 36 wherein said data is located in a first track of a first file and said second set of data is located in a second track of a second file.

39. The readable storage media of claim 21 wherein said data comprises SMPTE time codes.

40. The readable storage media of claim 21 wherein said data comprises Sprite based animation information.

41. A system for synchronizing data retrieval in a data processing system, said system comprising:

means for determining only one specified time for retrieving data from a storage media;

means for scheduling retrieval of said data from said storage media at or before said specified time;

means for retrieving said data from said storage media at or before said specified time has elapsed; and means for processing said data from said storage media.

42. The system of claim 41 wherein said data comprises video data and wherein said processing comprises providing at least a portion of said data to a display device.

43. The system of claim 41 wherein said data comprises audio data and wherein said processing comprises providing at least a portion of said data to a sound transducer.

44. The system of claim 41 wherein said means for scheduling retrieval of said data from said storage media at or before said specified time comprises:

means for retrieving information for locating said data in said storage media; and means for storing said information in a memory.

45. The system of claim 41 wherein said means for scheduling retrieval of said data from said storage media at or before said specified time comprises:

means for creating a retrieval request for retrieving said data from said storage media before said specified time.

46. The system of claim 45 wherein said means for scheduling retrieval of said data from said storage media at or before said specified time further comprises:

means for sorting pending retrieval requests.

47. The system of claim 45 wherein said means for scheduling retrieval of said data from said storage media at or before said specified time further comprises:

means for reading said data from said storage media; and means for notifying a requestor of data availability.

48. The system of claim 47 wherein reading said data from said storage media comprises reading said data through a computer network.

49. The system of claim 41 wherein said means for processing said data from said storage media comprises:

means for determining a specified display time for displaying said data; and means for scheduling a display interrupt to occur at said specified display time for displaying said data.

50. The system of claim 49 wherein said means for processing said data from said storage media further comprises:

means for displaying said data when said display interrupt occurs.

* * * * *